Nov. 18, 1947.   A. W. BIRD   2,431,227
TRUSS FITTING
Filed Dec. 10, 1946
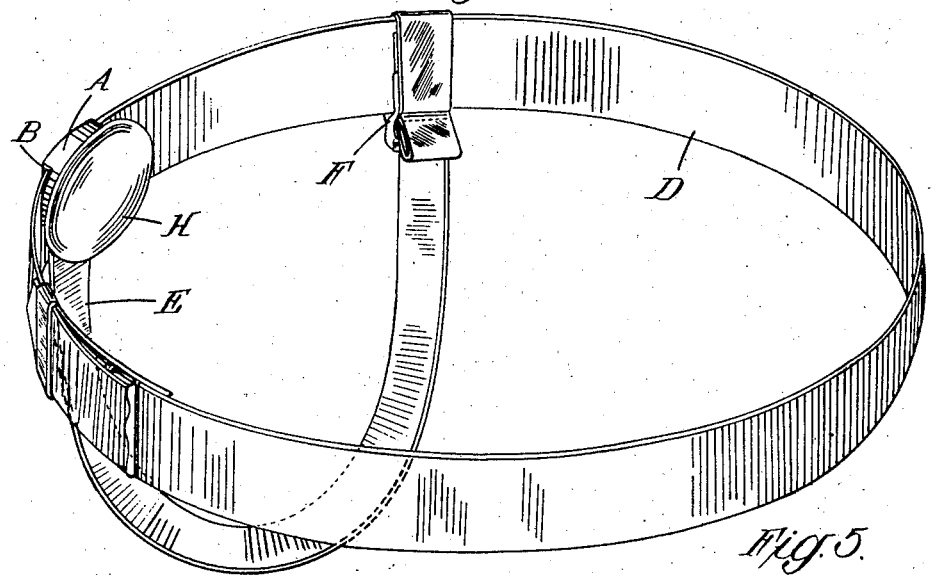
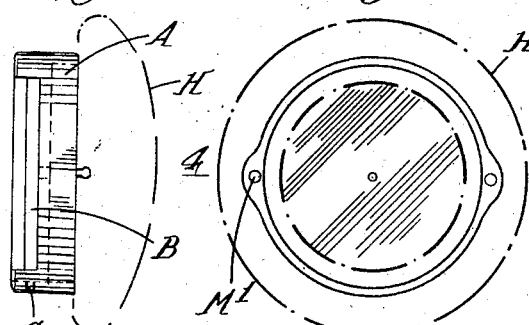
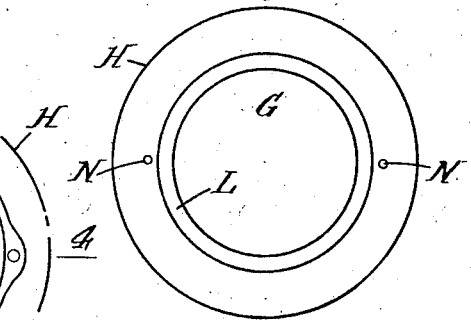
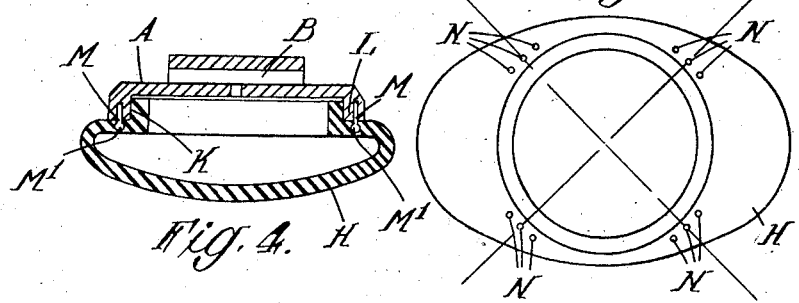
Inventor:
Arthur William Bird
by
Pennie, Edmonds, Morton and Barrows
Attorneys Patented Nov. 18, 1947

2,431,227

UNITED STATES PATENT OFFICE 2,431,227

TRUSS FITTING

Arthur William Bird, Sidcup, England, assignor to Brooks Appliance Company Limited, London, England, a corporation of Great Britain and Northern Ireland Application December 10, 1946, Serial No. 715,173
In Great Britain February 6, 1946

3 Claims. (Cl. 128—95)

The present invention relates to trusses for the treatment of hernia in man and more particularly to improvements connected with the rubber pads and the supporting bases or discs therefor employed in such trusses and has for its object an improved construction of the supporting base or disc and of the pads, whereby the same supporting base can be used for pads of various shapes and depths, while the position of pads such as oval pads in relation to the base can be varied and oval pads may be used for either the left or the right side of the patient.

In accordance with the invention the base which is of vulcanite or other plastic material and is formed on one face with the usual slots for a body band and for an underband is formed with a circular recess on its other face, while the pad is formed with a corresponding circular flange to fit within the recess. A rim or flange surrounding the recess in the base is provided with two pins upstanding from said flange which pins are formed with ball shaped heads while the rubber pad is formed with holes whereby when the flange on the pad is pressed into the recess the pins penetrate the holes in the rubber pad, the rubber closes over the shanks and heads of the pins and makes a firm fixture. Where the pad is other than circular it may be provided with a plurality of holes so that the position of the pad in relation to the base may be varied.

The invention is illustrated in the accompanying drawing in which Fig. 1 is a perspective view of a truss fitted with the improved pad and supporting base. Fig. 2 is a side elevation of the disc or base and with a circular rubber pad (shown in dot and dash lines) in position. Fig. 3 is a front view of the disc the pad being indicated in dot and dash lines. Fig. 4 is a section on the line 4—4 of Fig. 3 showing the pad. Fig. 5 is a rear view of a circular pad. Fig. 6 is a rear view of an oval pad with a plurality of holes disposed symmetrically of axes of the pad by which the orientation of the pad in relation to the base and thus to the truss band can be varied and by which moreover the pad can be used either for the right or left side of the patient.

As shown, the supporting disc or base A is provided as usual with slots B and C on its rear face for the body band D and for the under band E respectively, which latter is adapted to be secured to the body band in any adjusted position by means of the clasp F. The supporting base or disc A is provided on its front face with a circular recess G and the various pads H which may be used with that base are formed with a circular projecting flange K to fit within the recess G. On a rim or flange L surrounding the central recess G in the base A and at opposite sides of a diameter of the base are mounted upstanding pins M having ball-shaped heads M'. These pins are adapted to engage corresponding holes N in the portion of the pad surrounding the flange K the rubber closing over the shanks and heads of the pins when the pad is in place and forming a firm fixture.

In the circular pad shown in Figs. 1 to 5 only two holes N are provided but in the oval pad four series of holes N symmetrically disposed about axes of the pad are provided so that not only can adjustment of the position of the pad be effected but the same pad can be used for the right or the left side of the patient.

I claim:

1. A truss fitting including a base for attachment to the truss, said base formed with a circular recess, a flange surrounding the recess, at least one pair of ball headed pins mounted to project from said flange and a pad, said pad formed with a projecting flange to fit within said recess and formed externally of said last mentioned flange with recesses to receive and embrace said ball headed pins.

2. A truss fitting as claimed in claim 1 in which the upstanding pins are mounted substantially diametrically opposite one another on the flange of the base.

3. A truss fitting as claimed in claim 1 in which the pad is of non circular form and is formed with a plurality of recesses whereby the pad may be secured to the base in different positions.

ARTHUR WILLIAM BIRD.

REFERENCES CITED

The following references are of record in the file of this patent:

UNITED STATES PATENTS

| Number | Name | Date |
|---|---|---|
| 204,060 | Macdonald | May 21, 1878 |
| 239,482 | Garst | Mar. 29, 1881 |
| 341,176 | Smith | May 4, 1886 |
| 492,504 | Watson | Feb. 28, 1893 |
| 1,005,978 | Jones | Oct. 17, 1911 |
| 2,073,787 | Fritsch | Mar. 16, 1937 |